Jan. 3, 1961  H. M. RICHTER  2,967,042
STOP VALVE
Filed April 24, 1958
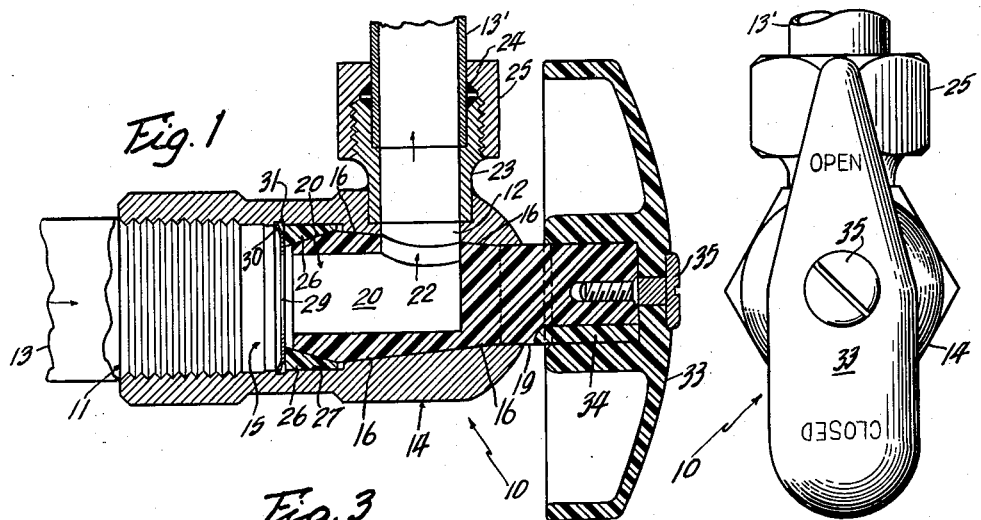
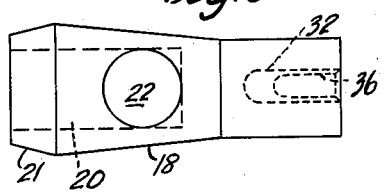
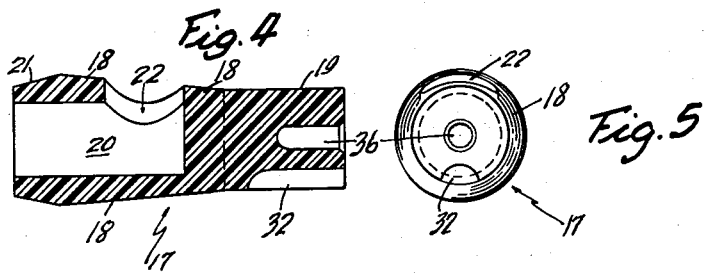
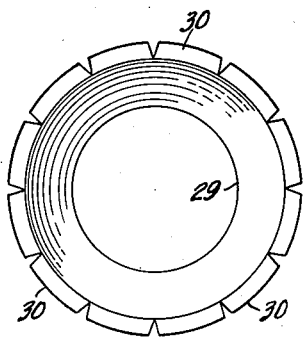
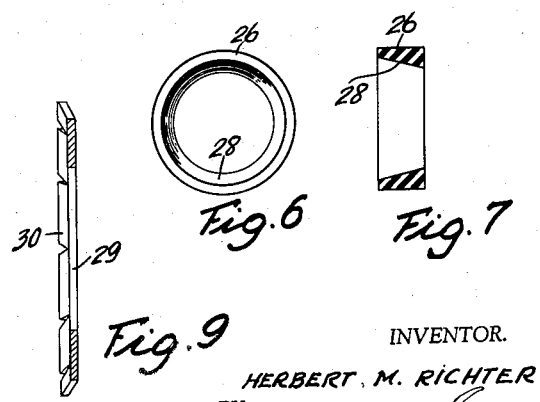
INVENTOR.
HERBERT M. RICHTER
BY Andros and Smith
ATTORNEYS United States Patent Office 2,967,042
Patented Jan. 3, 1961

2,967,042

STOP VALVE

Herbert M. Richter, 60 Colorado Road, Paramus, N.J.

Filed Apr. 24, 1958, Ser. No. 730,612

4 Claims. (Cl. 251—181)

This invention has to do with an improved type of stop or shut-off valve for pipe lines. More particularly, it relates to such a valve having a novel and simplified arrangement of structure adapted quickly to start and stop the flow in pipe lines for lavatories, showers, toilets, sinks and the like.

Generally, it is an object of the invention to avoid the necessity for using expensive and complicated conventional types of shut-off valves having threaded valve stems with replaceable bib washers designed for more frequent heavy duty use, and instead, to design and provide a stop valve that is simple and economic of manufacture, that eliminates threads and washers, cannot and need not be taken apart for repair, and is far better suited to the purposes above set forth for which it is intended rather than the expensive and cumbersome conventional valves now needlessly employed therefor.

More specifically, it is an object of the invention to provide a low-cost valve of the type having an end inlet and an angularly disposed side outlet in a valve body, adapted to be connected into a pipe line quickly to start and stop the flow of fluid therethrough, comprising a body having a longitudinal opening therethrough, an intermediate portion thereof tapered to provide a seat for a rotatable valve member, a tapered, resilient, self-sealing valve member fitted to rotate in a tapered seat and extending therebeyond in opposite directions to provide a solid handle receiving portion at one end opposite the inlet, and a hollow portion having a lock receiving tapered shoulder axially converging toward the inlet and in a direction opposite the first tapered portion of the member at its other end, and having a lateral discharge port adapted to be brought into and out of registry with the outlet upon rotation of the member; and spring locking means lodged within the opening fitted in abutting relation upon the shoulder to urge the member into snugly rotatable and frictional engagement with the tapered seat, the spring locking means including a tapered sealing ring to provide a seat for rotatably receiving the tapered shoulder of the inlet end of the member, and a spring locking ring in abutting relation with the sealing ring to hold the member in self-sealing compressed engagement in the body against said seat.

Other specific objects of the invention are to provide such locking means which includes a tapered sealing ring to provide a seat for the tapered shoulder of the stem, and a spring locking ring in abutting relation with the sealing ring; in which the sealing ring and valve stem are made of a relatively resilient material such as a self lubricating plastic, for example, a high density polyethylene; and in which a handle is provided for the solid valve stem portion having an elongated flow starting and stopping indicator or pointer radially extending therefrom and at all times being in the plane of the axis of the discharge port to indicate the relative position thereof with respect to the outlet.

Other objects of the invention will in part be obvious and will in part appear hereinafter.

The invention accordingly comprises an article of manufacture possessing the features, properties, and the relation of elements which will be exemplified in the article hereinafter described and the scope of the application of which will be indicated in the claims.

For a fuller understanding of the nature and objects of the invention reference should be had to the following detailed description taken in connection with the accompanying drawing, in which:

Fig. 1 is a longitudinal sectional view through such a stop valve embodied by the invention shown fitted in a pipe line;

Fig. 2 is an end elevational view of such a valve;

Fig. 3 is a plan view of a valve stem;

Fig. 4 is a longitudinal sectional view of Fig. 3;

Fig. 5 is an end view of Fig. 4;

Fig. 6 is an end elevational view of a sealing ring;

Fig. 7 is a vertical sectional view of Fig. 6;

Fig. 8 is an elevational view of a spring ring; and

Fig. 9 is a vertical sectional view of Fig. 8.

Referring more particularly to the drawing, there is indicated generally at 10 a valve assembly embodying the invention having an inlet 11 and an angularly disposed outlet 12 connected into a pipe line 13, 13'.

A body 14 is provided with a longitudinal opening or bore 15 extending therethrough. A portion of this opening or bore adjacent the end opposite the inlet 11, and around the area of the outlet is tapered as indicated at 16. A tapered valve member, indicated generally at 17, is fitted to rotate in the tapered seat by its being tapered as shown at 18.

The tapered valve member, it will be observed, extends in opposite directions beyond the tapered seat 16 of the body 14 to provide a solid handle receiving portion or stem 19 at one end opposite the inlet 11, and a hollow or tubular portion 20 having a lock receiving shoulder 21 that is tapered in a direction opposite the taper 18 and extending toward the inlet but confined within the body 14. A lateral discharge port 22 appears in the tubular portion 20 of the valve stem 17, which port normally for the flow of fluid is in coaxial alignment with the pipe line 13' by means of an externally threaded sleeve 23 fitted in the body 14 to receive the pipe portion 13' to which it is secured by a conventoinal ferrule 24 and internally threaded compression nut 25 adapted to engage the threaded sleeve 23.

Such a stem is end loaded into the body 14 from the inlet side 11 and in order snugly to seat the tapered portion 18 against the seat 16 and to maintain the same in freely rotatable and frictionally sealed engagement therewith, there is provided a sealing ring 26 adapted to fit into an annular portion 27 of the bore 11. Internally, the sealing ring is provided with a tapered seat 28 which receives the tapered shoulder 21 of the valve stem.

Pressure is brought to bear against the sealing ring by means of a dished metallic locking ring 29 having peripheral spring-like petals or fingers 30, which ring fits into an annular groove 31 in the bore 11. Such a locking ring is inserted under pressure in abutting relation with the sealing ring 26 and permanently lodged in position so that the valve cannot, and indeed need not, readily be disassembled.

The solid handle receiving portion 19 of the valve stem is provided with an appropriately located keyway 32 to receive a handle 33 of special configuration, the handle being provided with a key 34 for the keyway 32 and is secured in position by an appropriate screw 35 penetrating a coaxial opening 36 in the handle receiving portion 19 of the stem.

It will be observed from the drawing that the stem and sealing ring are indicated as being made of plastic which, like most plastics, has a certain amount of self-lubricating characteristics and should be of the type that has slight resiliency. The pressure brought to bear against the sealing ring and stem by the locking ring provides an excellent seal without interfering with the rotatable qualities of the valve stem in the valve seat 16 or in the seat 28 of the sealing ring. I prefer to use as such a plastic a high density polyethylene material. Such material is far more economical to use and washers of any kind are totally eliminated. Also, they can be cast in the form shown in Fig. 4 with the tubular portion and outlet, and the keyway without difficulty or machining.

In order further to cut down the cost I prefer to use a plastic type of handle which, however, I prefer to coat with metal so that the entire valve has a metal appearance.

Significant is the shape of the handle which is elongated and has a pointer that is at all times fitted on the valve stem so that its axis is in the plane of the axis of the outlet. When the pointer is aligned with the pipe line portion 13' the discharge port 22 will always be in registry therewith for the free flow of fluid therethrough. Such a valve can be quickly opened and shut off in case of emergency, always quickly indicating the relative position of the discharge port 22 and need not be given numerous random turns as with conventional valves to indicate whether the pipe line is open and closed.

It will thus be seen that the objects hereinbefore set forth may readily and efficiently be obtained and since certain changes may be made in the above article and different embodiments of the invention could be made without departing from the scope thereof, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention what I claim as new and desire to secure by Letters Patent is:

1. In a valve comprising a body having an inlet and an angularly disposed outlet, the body having a longitudinal opening therethrough extending from said inlet and being partially tapered so as to provide a valve seat, a passage in said body extending from said outlet and intersecting said tapered seat, a tapered resilient, self-sealing valve member mounted to rotate in said tapered seat, said valve member having a handle receiving portion on one end and having at its other end a lock receiving tapered shoulder axially converging toward said inlet in a direction opposite to the taper on the remainder of the valve member, said valve member having a passage means in continuous communication with said inlet and including a lateral discharge port selectively movable adapted to be brought into and out of registry with said outlet upon rotation of said member; and spring locking means lodged within said opening fitted in abutting relation upon said shoulder to urge said member into snugly rotatable and frictionally sealed engagement with said tapered seat, said spring locking means including a tapered sealing ring to provide a seat for rotatably receiving said tapered shoulder at the inlet end of said member, and a spring locking ring in abutting relation with said sealing ring to hold said member in self-sealing compressed engagement in said body against said seat.

2. In a valve assembly as set forth in claim 1, and wherein said tapered sealing ring and oppositely tapered, self-sealing valve stem comprise a material characterized in that it is a self-lubricating plastic.

3. In a valve assembly according to claim 2 in which said plastic material is a high density polyethylene.

4. In a valve assembly as defined in claim 1, and further characterized in that said solid handle receiving portion is provided with an elongated flow starting and stopping handle affixed thereto, terminating in a pointer radially extending therefrom and at all times being in the plane of the axis of said port to indicate the relative position thereof with respect to said outlet.

References Cited in the file of this patent
UNITED STATES PATENTS

| | | |
|---|---|---|
| 1,464,049 | Scheib | Aug. 7, 1923 |
| 1,728,769 | Pasman | Sept. 17, 1929 |
| 2,570,003 | Palmer | Oct. 2, 1951 |
| 2,711,846 | Birchall et al. | June 28, 1955 |

FOREIGN PATENTS

| | | |
|---|---|---|
| 818,713 | Germany | Oct. 29, 1951 |